(12) United States Patent
Zhou

(10) Patent No.: US 10,395,130 B2
(45) Date of Patent: Aug. 27, 2019

(54) FINGERPRINT REGISTRATION METHOD AND DEVICE AND TERMINAL THEREOF

(71) Applicant: Guangdong Oppo Mobile Telecommunications Corp., Ltd., Dongguan (CN)

(72) Inventor: Yibao Zhou, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 92 days.

(21) Appl. No.: 15/554,222

(22) PCT Filed: Aug. 31, 2016

(86) PCT No.: PCT/CN2016/097684
§ 371 (c)(1),
(2) Date: Aug. 29, 2017

(87) PCT Pub. No.: WO2017/080289
PCT Pub. Date: May 18, 2017

(65) Prior Publication Data
US 2018/0053062 A1    Feb. 22, 2018

(30) Foreign Application Priority Data
Nov. 13, 2015   (CN) .......................... 2015 1 0786340

(51) Int. Cl.
*G06K 9/00*   (2006.01)
*G06F 21/32*  (2013.01)
(Continued)

(52) U.S. Cl.
CPC ......... *G06K 9/00926* (2013.01); *G06F 21/32* (2013.01); *G06K 9/001* (2013.01);
(Continued)

(58) Field of Classification Search
CPC .. G06K 9/00926; G06K 9/00087; G06K 9/68; G06K 9/001; G06K 9/00013; G06K 9/0008; G06F 21/32; H04W 88/02
See application file for complete search history.

(56) References Cited

U.S. PATENT DOCUMENTS

2007/0177767 A1   8/2007   Miura et al.
2008/0212846 A1   9/2008   Yamamoto et al.
(Continued)

FOREIGN PATENT DOCUMENTS

CN        1588425 A     3/2005
CN      101520843 A     9/2009
(Continued)

OTHER PUBLICATIONS

Machine translation for KR20030073536 (Year: 2003).*

*Primary Examiner* — Qian Yang
(74) *Attorney, Agent, or Firm* — Young Basile Hanlon & MacFarlane, P.C.

(57) ABSTRACT

A fingerprint registration method, device and terminal thereof are proposed. The method includes: receiving a registered fingerprint image input at an Nth time by a user and retrieving feature points of the registered fingerprint image input at the Nth time; determining whether the registered fingerprint image input at the Nth time and registered fingerprint images input at N−1 times belong to a same finger based on the feature points of the registered fingerprint image input at the Nth time and feature points of the registered fingerprint images input at the N−1 times previous to the Nth time; and adding the registered fingerprint image input at the Nth time to a candidate collection of registered fingerprint images if the registered fingerprint image input at the Nth time and the registered fingerprint images input at the N−1 times belong to the same finger.

20 Claims, 3 Drawing Sheets

(51) Int. Cl.
*G06K 9/68* (2006.01)
*H04W 88/02* (2009.01)

(52) U.S. Cl.
CPC ....... *G06K 9/0008* (2013.01); *G06K 9/00013* (2013.01); *G06K 9/00087* (2013.01); *G06K 9/68* (2013.01); *H04W 88/02* (2013.01)

(56) References Cited

U.S. PATENT DOCUMENTS

| | | |
|---|---|---|
| 2009/0052752 A1 | 2/2009 | Monden |
| 2013/0279770 A1 | 10/2013 | Abe |
| 2014/0145821 A1* | 5/2014 | Wang ................. G07C 9/00142 340/5.54 |
| 2015/0074615 A1* | 3/2015 | Han ................... G06K 9/00033 715/863 |
| 2016/0292490 A1* | 10/2016 | Cheng ................ G06K 9/00033 |

FOREIGN PATENT DOCUMENTS

| | | |
|---|---|---|
| CN | 101620675 A | 1/2010 |
| CN | 101777128 A | 7/2010 |
| CN | 102708360 A | 10/2012 |
| CN | 104036269 A | 9/2014 |
| CN | 104077576 A | 10/2014 |
| CN | 104335226 A | 2/2015 |
| CN | 105426835 A | 3/2016 |
| EP | 1840832 A1 | 10/2007 |
| KR | 20030073536 | * 9/2003 |

* cited by examiner

FINGERPRINT REGISTRATION METHOD AND DEVICE AND TERMINAL THEREOF

CROSS REFERENCE TO RELATED APPLICATION

This application is a US national phase application based upon International Application No. PCT/CN2016/097684, filed on Aug. 31, 2016, which claims priority to Chinese Application No. 201510786291.6, filed on Nov. 13, 2015. The entire disclosures of the above applications are incorporated herein by reference.

BACKGROUND OF THE INVENTION

1. Field of the Invention

The present disclosure relates to a mobile terminal technology, more particularly, to a fingerprint registration method and a device and a terminal thereof.

2. Description of the Related Art

With the progress of science and technology, smart mobile terminals have already become an indispensable tool of human life. The smart mobile terminals added with the fingerprint recognition technology have become a mainstream technical scheme. Not only can the fingerprint recognition technology be applied to unlock, wake-up, and the like functions of mobile terminals, but the fingerprint recognition technology is also an important part of mobile payment. Currently, when a user registers his fingerprint, the user is usually required to record his fingerprint multiple times to increase the success rate of finger recognition. For example, a fingerprint template is not successfully registered until the fingerprint has been recorded about twenty times in the first registration. However, using the multiple recording to register the fingerprint has the following drawback: the registration will also be successful when the user uses multiple fingers to register a same fingerprint. If the user records three different fingers, that are, the thumb, the index finger, and the middle finger, for a total of twenty times, the fingerprint of any one of the three fingers can often be recognized successfully after the fingerprint registration is successful. As a result, the false accept rate of finger recognition becomes higher and worry of security thus exists.

SUMMARY

A first objective of the present disclosure is to provide a fingerprint registration method. The method can avoid the problem that multiple fingers register a same fingerprint to eliminate the worry of security.

A second objective of the present application is to provide a fingerprint registration device.

A third objective of the present application is to provide a mobile terminal.

A fourth objective of the present application is to provide a non-transitory computer-readable storage medium.

In an embodiment of a first aspect, the present disclosure provides a fingerprint registration method to achieve the objectives. The fingerprint registration method includes the following blocks: A registered fingerprint image input at an Nth time by a user is received and feature points of the registered fingerprint image input at the Nth time are retrieved, wherein N is a positive integer; whether the registered fingerprint image input at the Nth time and registered fingerprint images input at N−1 times belong to a same finger is determined based on the feature points of the registered fingerprint image input at the Nth time and feature points of the registered fingerprint images input at the N−1 times previous to the Nth time; the registered fingerprint image input at the Nth time is added to a candidate collection of registered fingerprint images if the registered fingerprint image input at the Nth time and the registered fingerprint images input at the N−1 times belong to the same finger. A fingerprint template is generated correspondingly based on the registered fingerprint images in the candidate collection of registered fingerprint images.

In an embodiment of a second aspect, a fingerprint registration device is provided. The fingerprint registration device includes a receiving module, a judge module and an adding module. The receiving module is configured to receive a registered fingerprint image input at an Nth time by a user and retrieve feature points of the registered fingerprint image input at the Nth time. N is a positive integer. The judge module is configured to determine whether the registered fingerprint image input at the Nth time and registered fingerprint images input at N−1 times belong to a same finger based on the feature points of the registered fingerprint image input at the Nth time and feature points of the registered fingerprint images input at the N−1 times previous to the Nth time. The adding module is configured to add the registered fingerprint image input at the Nth time to a candidate collection of registered fingerprint images if the registered fingerprint image input at the Nth time and the registered fingerprint images input at the N−1 times belong to the same finger. A fingerprint template is generated correspondingly based on the registered fingerprint images in the candidate collection of registered fingerprint images.

In an embodiment of a third aspect, the terminal includes a casing, a processor, a memory, a circuit board, and a power circuit. The circuit board is disposed in a space surrounded by the casing. The processor and the memory are disposed on the circuit board. The power circuit is configured to supply power to various circuits or components of the terminal. The memory is configured to store executable program instructions. The processor runs a program corresponding to the executable program instructions through reading the executable program instructions stored in the memory so as to execute the following blocks: A registered fingerprint image input at an Nth time by a user is received and feature points of the registered fingerprint image input at the Nth time are retrieved, wherein N is a positive integer; whether the registered fingerprint image input at the Nth time and registered fingerprint images input at N−1 times belong to a same finger is determined based on the feature points of the registered fingerprint image input at the Nth time and feature points of the registered fingerprint images input at the N−1 times previous to the Nth time; the registered fingerprint image input at the Nth time is added to a candidate collection of registered fingerprint images if the registered fingerprint image input at the Nth time and the registered fingerprint images input at the N−1 times belong to the same finger. A fingerprint template is generated correspondingly based on the registered fingerprint images in the candidate collection of registered fingerprint images.

In an embodiment of a fourth aspect, a non-transitory computer-readable storage medium is provided. The non-transitory computer-readable storage medium stores one or more program instructions executable by a device. The device executes the one or more program instructions to perform the fingerprint registration method as provided above.

The present disclosure avoids the problem that multiple fingers register a same fingerprint, eliminates the security worries and improves the user experience.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
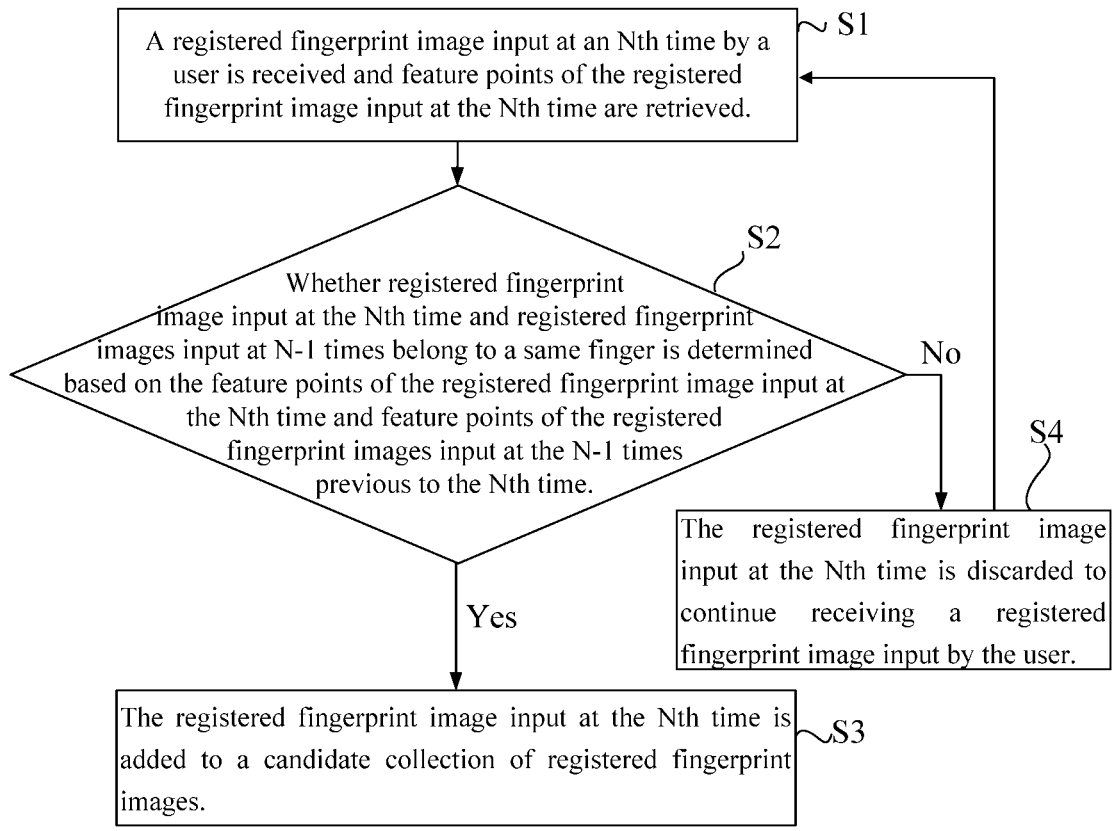
FIG. 1 illustrates a flowchart of a fingerprint registration method according to one embodiment of the present disclosure.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

A description of a fingerprint registration method and a device and a terminal thereof according to embodiments of the present disclosure is provided as follows with reference to accompanying drawings.

FIG. 1 illustrates a flowchart of a fingerprint registration method according to one embodiment of the present disclosure.

As shown in FIG. 1, the fingerprint registration method can begin at block S1.

At block S1, a registered fingerprint image input at an Nth time by a user is received and feature points of the registered fingerprint image input at the Nth time are retrieved.

In greater detail, the registered fingerprint image input at the Nth time by the user can be received, and then the feature points of the registered fingerprint image are retrieved correspondingly. N is a positive integer, such as a 5th time. The feature points are information for describing fingerprint features. The most typical ones are an end point and a bifurcation point, and may further include a divergence point, an island, an enclosure, a short ridge, etc.

At block S2, whether the registered fingerprint image input at the Nth time and registered fingerprint images input at N−1 times_belong to a same finger is determined based on the feature points of the registered fingerprint image input at the Nth time and feature points of the registered fingerprint images input at the N−1 times previous to the Nth time.

In greater detail, the feature points of the registered fingerprint image input at the Nth time may be matched with the feature points of the registered fingerprint images input at the N−1 times to generate N−1 match scores. If all the N−1 match scores are more than a preset threshold value, it is determined that the registered fingerprint image input at the Nth time and the registered fingerprint images input at the N−1 times belong to the same finger. If any of the N−1 match scores is less than the preset threshold value, it is determined that the registered fingerprint image input at the Nth time and the registered fingerprint images input at the N−1 times do not belong to the same finger. For example, if N is equal to 5, that is, feature points of a registered fingerprint image input at the 5th time may be respectively matched with feature points of registered fingerprint images input the previous four times to generate four match scores, namely, a first match score, a second match score, a third match score and a fourth match score. The match scores may be determined based on a number of same feature points in registered fingerprint images input at multiple times. If a number of feature points of a registered fingerprint image input every time is 100 and if a number of same feature points in the registered fingerprint images input at the 5th time and at the 1th time is 91, the first match score may be 91 correspondingly. Similarly, if a number of same feature points in the registered fingerprint images input at the 5th time and at the 2nd time is 93, the second match score may be 93 correspondingly. If a number of same feature points in the registered fingerprint images input at the 5th time and at the 3rd time is 94, the third match score may be 94 correspondingly. If a number of same feature points in the registered fingerprint images input at the 5th time and at the 4th time is 92, the fourth match score may be 92 correspondingly. Since all the above four match scores are more than the preset threshold value 90, it is determined that the registered fingerprint images input at the 5th time and the previous four times belong to the same finger. If the first match score is 80, the second match score is 93, the third match score is 94 and the fourth match score is 92, the first match score is less than the preset threshold value 90. It is determined that the registered fingerprint images input at the 5th time and the previous four times do not belong to the same finger.

After receiving the registered fingerprint image input by the user every time, the feature points of the registered fingerprint image are correspondingly retrieved and are stored so as to be used to match with feature points of a registered fingerprint image input at a next time by the user.

It should be understood that the above method for acquiring the match scores only serves as an example, and the feature points of the registered fingerprint image input at the Nth time may be matched with superimposed feature points of the registered fingerprint images input at the previous N−1 times to obtain a match score. For example, the feature points of the registered fingerprint image input at the 1th time include a, b, c, d, e and f, the feature points of the registered fingerprint image input at the 2nd time include a, b, d, e and g. The superimposed feature points of the two may be a, b, c, d, e, f, g, and the feature points of the registered fingerprint image input at the 3rd time include a, b, c, d, f, g and h. The feature points of the registered fingerprint image input at the 3rd time are matched with the superimposed feature points of the two to obtain a match score correspondingly. The accuracy of judgment is further improved.

At block S3, the registered fingerprint image input at the Nth time is added to a candidate collection of registered fingerprint images if the registered fingerprint image input at the Nth time and the registered fingerprint images input at the N−1 times belong to the same finger.

A description is provided with reference to the example shown in the previous block. When the registered fingerprint image input at the 5th time and the registered fingerprint images input the previous four times belong to the same finger, the registered fingerprint image input at the 5th time may be added to the candidate collection of registered fingerprint images. Then, a fingerprint template can be generated correspondingly based on the registered fingerprint images input the first five times.

At block S4, the registered fingerprint image input at the Nth time is discarded to continue receiving a registered fingerprint image input by the user if the registered fingerprint image input at the Nth time and the registered fingerprint images input at the N−1 times do not belong to the same finger.

In greater detail, if the registered fingerprint image input at the 5th time and the registered fingerprint images input the previous four times do not belong to the same finger, the registered fingerprint image input at the 5th time may be discarded, then the registered fingerprint image re-input by the user is continuously received, and a subsequent judgment block is performed.

In addition, a number of times that the registered fingerprint image input at the Nth time and the registered fingerprint images input at the N−1 times do not belong to the same finger may further be recorded. When the number of times exceeds a first preset threshold value, such as three times, a prompt message may be sent to the user to ask the user to input a fingerprint image of the same finger, such as "It is detected that another finger is registering, please input the same finger", etc.

When the number of times exceeds a second preset threshold value, such as ten times, a prompt of whether to delete the registered fingerprint images that have been stored or not may be sent to the user. If an instruction to delete from the user is received, the registered fingerprint images input at the N−1 times can be deleted. For example, when the user inputs the registered fingerprint image at the 5th time, the input registered fingerprint images have continuously been determined not to belong to the same finger as the registered fingerprint images input the previous four times for ten times, "Your fingerprint recording has erred more than ten times, whether to delete the data previously recorded or not" may be prompted to the user. If the user selects "yes", the registered fingerprint images input the previous four times can be deleted.

According to the fingerprint registration method of the present embodiment, the registered fingerprint image input at the Nth time by the user is received and the feature points of the registered fingerprint image input at the Nth time are retrieved. Whether the registered fingerprint image input at the Nth time and the registered fingerprint images input at the N−1 times belong to the same finger is determined based on the feature points of the registered fingerprint image input at the Nth time and the feature points of the registered fingerprint images input at the N−1 times previous to the Nth time. If they belong to the same finger, the registered fingerprint image input at the Nth time is added to the candidate collection of registered fingerprint images to avoid the problem that multiple fingers register a same fingerprint. The security worries are eliminated and user experience is improved.

In order to achieve the above objectives, the present disclosure further provides a fingerprint registration device.

Figure 2:
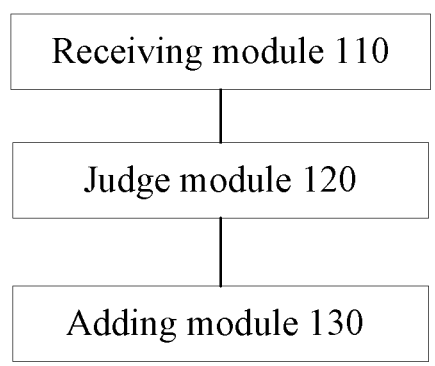
FIG. 2 illustrates a schematic diagram of a structure of a fingerprint registration device according to one embodiment of the present disclosure.

FIG. 2 illustrates a schematic diagram of a structure of a fingerprint registration device according to one embodiment of the present disclosure.

As shown in FIG. 2, the fingerprint registration device may include: a receiving module 110, a judge module 120 and an adding module 130.

The receiving module 110 can receive a registered fingerprint image input at an Nth time by a user and retrieve feature points of the registered fingerprint image input at the Nth time. In greater detail, the receiving module 110 can receive the registered fingerprint image input at the Nth time by the user, and retrieve the feature points of the registered fingerprint image correspondingly. N is a positive integer, such as a 5th time. The feature points are information for describing fingerprint features. The most typical ones are an end point and a bifurcation point, and may further include a divergence point, an island, an enclosure, a short ridge, etc.

The judge module 120 can determine whether the registered fingerprint image input at the Nth time and registered fingerprint images input at N−1 times belong to a same finger based on the feature points of the registered fingerprint image input at the Nth time and feature points of the registered fingerprint images input at the N−1 times previous to the Nth time.

In greater detail, the judge module 120 can determine whether the feature points of the registered fingerprint image input at the Nth time matches with the feature points of the registered fingerprint images input at the N−1 times to generate N−1 match scores. If all the N−1 match scores are more than a preset threshold value, it is determined that the registered fingerprint image input at the Nth time and the registered fingerprint images input at the N−1 times belong to the same finger. If any of the N−1 match scores is less than the preset threshold value, it is determined that the registered fingerprint image input at the Nth time and the registered fingerprint images input at the N−1 times do not belong to the same finger. For example, if N is equal to 5, that is, feature points of a registered fingerprint image input at the 5th time may be respectively matched with feature points of registered fingerprint images input the previous four times to generate four match scores, namely, a first match score, a second match score, a third match score and a fourth match score. The match scores may be determined based on a number of same feature points in registered fingerprint images input at multiple times. If a number of feature points of a registered fingerprint image input every time is 100 and if a number of same feature points in the registered fingerprint images input at the 5th time and at the 1th time is 91, the first match score may be 91 correspondingly. Similarly, if a number of same feature points in the registered fingerprint images input at the 5th time and at the 2nd time is 93, the second match score may be 93 correspondingly. If a number of same feature points in the registered fingerprint images input at the 5th time and at the 3rd time is 94, the third match score may be 94 correspondingly. If a number of same feature points in the registered fingerprint images input at the 5th time and at the 4th time is 92, the fourth match score may be 92 correspondingly. Since all the above four match scores are more than the preset threshold value 90, it is determined that the registered fingerprint images input at the 5th time and the previous four times belong to the same finger. If the first match score is 80, the second match score is 93, the third match score is 94 and the fourth match score is 92, the first match score is less than the preset threshold value 90. It is determined that the registered fingerprint images input at the 5th time and the previous four times do not belong to the same finger.

After receiving the registered fingerprint image input by the user every time, the feature points of the registered fingerprint image are correspondingly retrieved and are stored so as to be used to match with feature points of a registered fingerprint image input at a next time by the user.

It should be understood that the above method for acquiring the match scores only serves as an example, and the feature points of the registered fingerprint image input at the Nth time may be matched with superimposed feature points of the registered fingerprint images input at the previous N−1 times to obtain a match score. For example, the feature points of the registered fingerprint image input at the 1th time include a, b, c, d, e and f, the feature points of the registered fingerprint image input at the 2nd time include a, b, d, e and g. The superimposed feature points of the two may be a, b, c, d, e, f, g, and the feature points of the registered fingerprint image input at the 3rd time include a, b, c, d, f, g and h. The feature points of the registered fingerprint image input at the 3rd time are matched with the superimposed feature points of the two to obtain a match score correspondingly. The accuracy of judgment is further improved.

The adding module 130 adds the registered fingerprint image input at the Nth time to a candidate collection of registered fingerprint images if the registered fingerprint image input at the Nth time and the registered fingerprint images input at the N−1 times belong to the same finger.

A description is provided with reference to the example shown in the previous block. When the registered fingerprint image input at the 5th time and the registered fingerprint images input the previous four times belong to the same finger, the adding module 130 may add the registered fingerprint image input at the 5th time to the candidate collection of registered fingerprint images. Then, a fingerprint template can be generated correspondingly based on the registered fingerprint images input the first five times.

Figure 3:
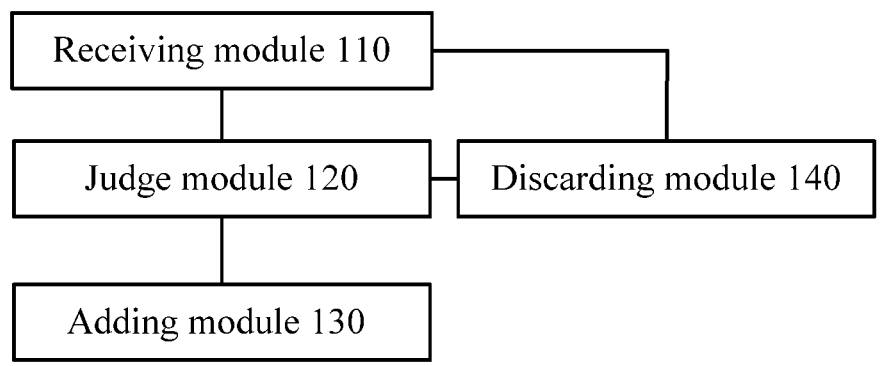
FIG. 3 illustrates a schematic diagram of a structure of a fingerprint registration device according to another embodiment of the present disclosure.

Furthermore, as illustrated in FIG. 3, the fingerprint registration device may further include a discarding module 140.

The discarding module 140 can discard the registered fingerprint image input at the Nth time when the registered fingerprint image input at the Nth time and the registered fingerprint images input at the N−1 times do not belong to the same finger. Then, the receiving module 110 continues receiving a registered fingerprint image input by the user.

A description is provided with reference to the example shown in the previous block. If the registered fingerprint image input at the 5th time and the registered fingerprint images input the previous four times do not belong to the same finger, the registered fingerprint image input at the 5th time may be discarded, then the receiving module 110 continues receiving the registered fingerprint image re-input by the user.

Figure 4:
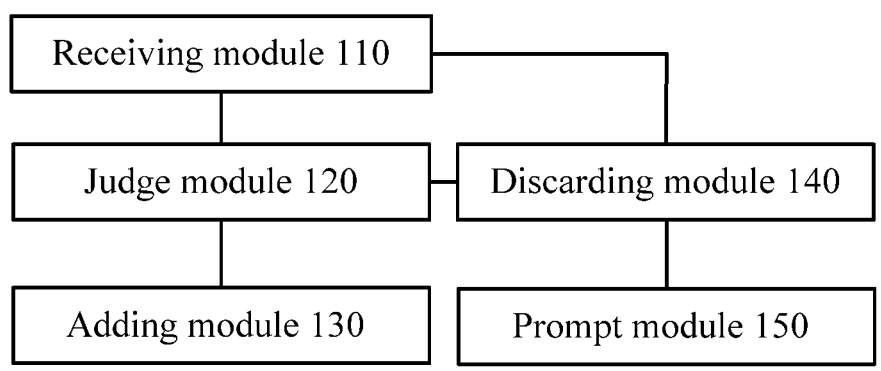
FIG. 4 illustrates a schematic diagram of a structure of a fingerprint registration device according to still another embodiment of the present disclosure.
Figure 5:
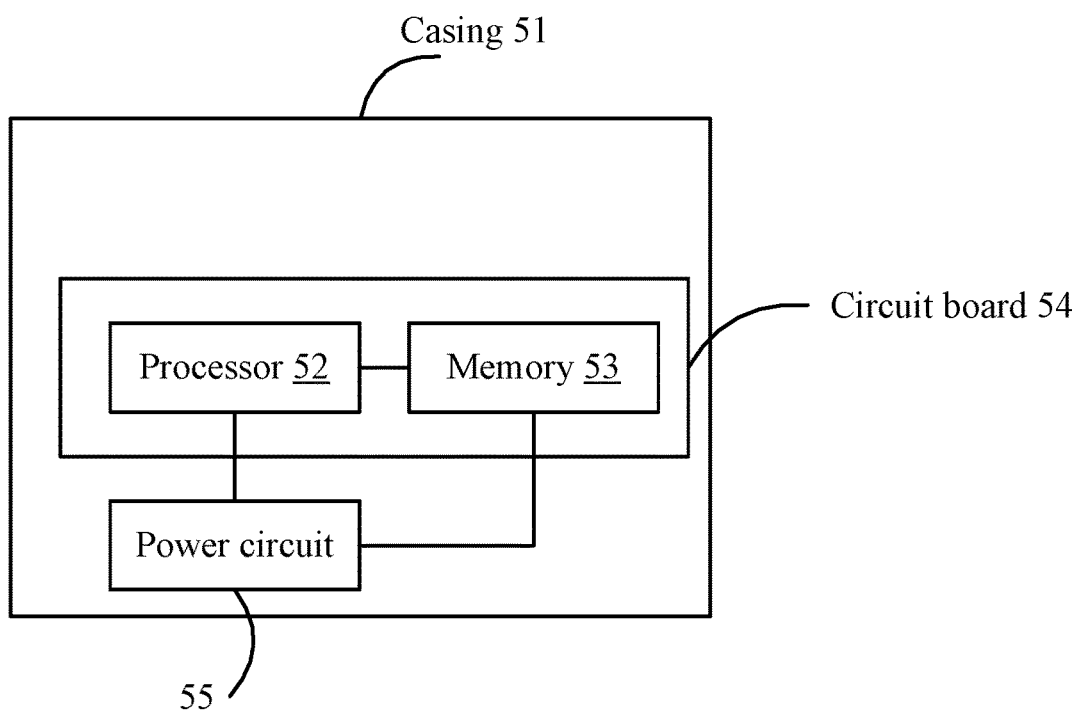
FIG. 5 illustrates a schematic diagram of a structure of a mobile terminal according to one embodiment of the present disclosure.

In addition, as shown in FIG. 4, the fingerprint registration device may further include a prompt module 150.

The prompt module 150 can record a number of times that the registered fingerprint image input at the Nth time and the registered fingerprint images input at the N−1 times do not belong to the same finger, and send a prompt message to the user to ask the user to input a fingerprint image of the same finger when the number of times exceeds a first preset threshold value. For example, when the number of times exceeds three times, the prompt message may be sent to the user, such as "It is detected that another finger is registering, please input the same finger", etc.

When the number of times exceeds a second preset threshold value, such as ten times, the prompt module 150 generates a prompt of whether to delete the registered fingerprint images that have been stored or not may be sent to the user. If an instruction to delete from the user is received, the registered fingerprint images input at the N−1 times can be deleted. For example, when the user inputs the registered fingerprint image at the 5th time, the input registered fingerprint images have continuously been determined not to belong to the same finger as the registered fingerprint images input the previous four times for ten times, "Your fingerprint recording has erred more than ten times, whether to delete the data previously recorded or not" may be prompted to the user. If the user selects "yes", the registered fingerprint images input the previous four times can be deleted.

According to the fingerprint registration device of the present embodiment, the registered fingerprint image input at the Nth time by the user is received and the feature points of the registered fingerprint image input at the Nth time are retrieved. Whether the registered fingerprint image input at the Nth time and the registered fingerprint images input at the N−1 times belong to the same finger is determined based on the feature points of the registered fingerprint image input at the Nth time and the feature points of the registered fingerprint images input at the N−1 times previous to the Nth time. If they belong to the same finger, the registered fingerprint image input at the Nth time is added to the candidate collection of registered fingerprint images to avoid the problem that multiple fingers register a same fingerprint. The security worries are eliminated and user experience is improved.

In order to realize the above embodiments, the present disclosure further provides a mobile terminal. The mobile terminal includes a casing, a processor, a memory, a circuit board and a power circuit. The circuit board is disposed in a space surrounded by the casing. The processor and the memory are disposed on the circuit board. The power circuit is configured to supply power to various circuits or components of the mobile terminal. The processor is configured to run a program corresponding to executable program code through reading the executable program code stored in the memory.

The processor is configured to process data so as to implement the following blocks.

At block S1', a registered fingerprint image input at an Nth time by a user is received and feature points of the registered fingerprint image input at the Nth time are retrieved.

In greater detail, the registered fingerprint image input at the Nth time by the user can be received, and then the feature points of the registered fingerprint image are retrieved correspondingly. N is a positive integer, such as a 5th time. The feature points are information for describing fingerprint features. The most typical ones are an end point and a bifurcation point, and may further include a divergence point, an island, an enclosure, a short ridge, etc.

At block S2', whether the registered fingerprint image input at the Nth time and registered fingerprint images input at N−1 times_belong to a same finger is determined based on the feature points of the registered fingerprint image input at the Nth time and feature points of the registered fingerprint images input at the N−1 times previous to the Nth time.

In greater detail, the feature points of the registered fingerprint image input at the Nth time may be matched with the feature points of the registered fingerprint images input at the N−1 times to generate N−1 match scores. If all the N−1 match scores are more than a preset threshold value, it is determined that the registered fingerprint image input at the Nth time and the registered fingerprint images input at the N−1 times belong to the same finger. If any of the N−1 match scores is less than the preset threshold value, it is determined that the registered fingerprint image input at the Nth time and the registered fingerprint images input at the N−1 times do not belong to the same finger. For example, if N is equal to 5, that is, feature points of a registered fingerprint image input at the 5th time may be respectively matched with feature points of registered fingerprint images input the previous four times to generate four match scores, namely, a first match score, a second match score, a third match score and a fourth match score. The match scores may be determined based on a number of same feature points in registered fingerprint images input at multiple times. If a number of feature points of a registered fingerprint image input every time is 100 and if a number of same feature points in the registered fingerprint images input at the 5th time and at the 1th time is 91, the first match score may be 91 correspondingly. Similarly, if a number of same feature points in the registered fingerprint images input at the 5th time and at the 2nd time is 93, the second match score may be 93 correspondingly. If a number of same feature points in the registered fingerprint images input at the 5th time and at the 3rd time is 94, the third match score may be 94 correspondingly. If a number of same feature points in the registered fingerprint images input at the 5th time and at the 4th time is 92, the fourth match score may be 92 correspondingly. Since all the above four match scores are more than the preset threshold value 90, it is determined that the registered fingerprint images input at the 5th time and the previous four times belong to the same finger. If the first match score is 80, the second match score is 93, the third match score is 94 and the fourth match score is 92, the first match score is less than the preset threshold value 90. It is determined that the registered fingerprint images input at the 5th time and the previous four times do not belong to the same finger.

After receiving the registered fingerprint image input by the user every time, the feature points of the registered fingerprint image are correspondingly retrieved and are stored so as to be used to match with feature points of a registered fingerprint image input at a next time by the user.

It should be understood that the above method for acquiring the match scores only serves as an example, and the feature points of the registered fingerprint image input at the Nth time may be matched with superimposed feature points of the registered fingerprint images input at the previous N−1 times to obtain a match score. For example, the feature points of the registered fingerprint image input at the 1th time include a, b, c, d, e and f, the feature points of the registered fingerprint image input at the 2nd time include a, b, d, e and g. The superimposed feature points of the two may be a, b, c, d, e, f, g, and the feature points of the registered fingerprint image input at the 3rd time include a, b, c, d, f, g and h. The feature points of the registered fingerprint image input at the 3rd time are matched with the superimposed feature points of the two to obtain a match score correspondingly. The accuracy of judgment is further improved.

At block S3', the registered fingerprint image input at the Nth time is added to a candidate collection of registered fingerprint images if the registered fingerprint image input at the Nth time and the registered fingerprint images input at the N−1 times belong to the same finger.

A description is provided with reference to the example shown in the previous block. When the registered fingerprint image input at the 5th time and the registered fingerprint images input the previous four times belong to the same finger, the registered fingerprint image input at the 5th time may be added to the candidate collection of registered fingerprint images. Then, a fingerprint template can be generated correspondingly based on the registered fingerprint images input the first five times.

At block S4', the registered fingerprint image input at the Nth time is discarded to continue receiving a registered fingerprint image input by the user if the registered fingerprint image input at the Nth time and the registered fingerprint images input at the N−1 times do not belong to the same finger.

In greater detail, if the registered fingerprint image input at the 5th time and the registered fingerprint images input the previous four times do not belong to the same finger, the registered fingerprint image input at the 5th time may be discarded, then the registered fingerprint image re-input by the user is continuously received, and a subsequent judgment block is performed.

In addition, a number of times that the registered fingerprint image input at the Nth time and the registered fingerprint images input at the N−1 times do not belong to the same finger may further be recorded. When the number of times exceeds a first preset threshold value, such as three times, a prompt message may be sent to the user to ask the user to input a fingerprint image of the same finger, such as "It is detected that another finger is registering, please input the same finger", etc.

When the number of times exceeds a second preset threshold value, such as ten times, a prompt of whether to delete the registered fingerprint images that have been stored or not may be sent to the user. If an instruction to delete from the user is received, the registered fingerprint images input at the N−1 times can be deleted. For example, when the user inputs the registered fingerprint image at the 5th time, the input registered fingerprint images have continuously been determined not to belong to the same finger as the registered fingerprint images input the previous four times for ten times, "Your fingerprint recording has erred more than ten times, whether to delete the data previously recorded or not" may be prompted to the user. If the user selects "yes", the registered fingerprint images input the previous four times can be deleted.

According to the mobile terminal of the present embodiment, the registered fingerprint image input at the Nth time by the user is received and the feature points of the registered fingerprint image input at the Nth time are retrieved. Whether the registered fingerprint image input at the Nth time and the registered fingerprint images input at the N−1 times belong to the same finger is determined based on the feature points of the registered fingerprint image input at the Nth time and the feature points of the registered fingerprint images input at the N−1 times previous to the Nth time. If they belong to the same finger, the registered fingerprint image input at the Nth time is added to the candidate collection of registered fingerprint images to avoid the problem that multiple fingers register a same fingerprint. The security worries are eliminated and user experience is improved.

In order to realize the above embodiments, the present application further provides a non-transitory computer-readable storage medium storing a plurality of program instructions executable by a device. The device executes the plurality of program instructions to perform the fingerprint registration method as provided in the embodiments with reference to FIG. 1.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

Any process or method described in the flowchart or otherwise described herein may be understood to include one or more modules, fragments, or portions of code of an executable instruction to implement a particular logical function or process. In addition, the scope of at least one embodiment of the present disclosure includes additional implementations in which the functions may be performed in a sequence that is not shown or discussed, including in a substantially simultaneous manner or in the reverse order depending on the function involved, which is understood by those skilled in the art to which this present disclosure pertains.

The logic and/or blocks described in the flowchart or otherwise described herein, for example, a sequence list of an executable instruction for implementing a logic function, may be implemented in any computer-readable medium for use by an instruction execution system, device or equipment (such as a computer-based system, a system including a processor, or other system that can access instructions from an instruction execution system, device or equipment and execute instructions), or may be used in conjunction with the instruction execution system, device or equipment. As used herein, "computer-readable medium" may be any device that may include a store, communication, broadcast, or transmission program for use by an instruction execution system, device or equipment, or in conjunction with such instruction execution systems, device, or equipment. A more specific example (non-exhaustive list) of the computer-readable medium includes the following: an electrical connection portion (an electronic device) with one or more routing, a portable computer disk cartridge (a magnetic device), a random access memory (RAM), a read only memory (ROM), an erasable programmable read only memory (EPROM or a flash memory), a fiber optic device, and a portable compact disc read only memory (CDROM). In addition, the computer-readable medium may even be a paper or other suitable medium on which the program may be printed. For example, through performing an optical scan on the paper or other media, followed by editing, interpretation, or, if necessary, other suitable methods to process, the program is obtained in an electronic manner, and then the program is stored in a computer memory.

It should be understood that the various parts of the present disclosure may be implemented by using hardware, software, firmware, or combinations thereof. In the above embodiment, the plurality of blocks or methods may be implemented by using software or firmware stored in the memory and executed by a suitable instruction execution system. For example, if the present disclosure is implemented by hardware, as in another embodiment, it may be implemented by any of the following techniques known in the art or a combination thereof: a discrete logic circuit of logic gates having a logic function for a data signal, an application specific integrated circuit with suitable combinational logic gates, a programmable gate array (PGA), a field programmable gate array (FPGA), and the like.

It will be understood by those of ordinary skill in the art that all or part of the blocks for implementing the method of the embodiments described above may be accomplished by a program that commands the relevant hardware. The program may be stored in a computer readable storage medium. When the program is executed, one of the blocks of the method embodiment or a combination thereof may be included.

In addition, the functional units in the various embodiments of the present disclosure may be integrated into a processing module, or each unit may be physically present individually, or two or more units may be integrated into one module. The above integrated module may be implemented by using hardware, or may be implemented by using a software function module. The integrated module may be stored in a computer readable storage medium if it is implemented by a software function module and is sold or used as a standalone product.

The above-mentioned storage medium may be a read-only memory, a magnetic disk, or an optical disk. While the embodiments of the present disclosure have been shown and described above, it is to be understood that the above embodiments are exemplary and are not to be construed as limiting the present disclosure. One of ordinary skill in the art may make variations, modifications, substitutions and alterations to the above embodiments within the scope of the present disclosure.

What is claimed is:

1. A fingerprint registration method performed by a mobile terminal, the fingerprint registration method comprising:

receiving a registered fingerprint image input at an Nth time by a user and retrieving feature points of the registered fingerprint image input at the Nth time, wherein N is a positive integer;

determining whether the registered fingerprint image input at the Nth time and registered fingerprint images input at N−1 times belong to a same finger based on the feature points of the registered fingerprint image input at the Nth time and feature points of the registered fingerprint images input at the N−1 times previous to the Nth time;

adding the registered fingerprint image input at the Nth time to a candidate collection of registered fingerprint images if the registered fingerprint image input at the Nth time and the registered fingerprint images input at the N−1 times belong to the same finger, wherein a fingerprint template is generated correspondingly based on registered fingerprint images in the candidate collection of registered fingerprint images; and receiving a next registered fingerprint image input at an (N+1)th time by the user, if N is less than a predetermined threshold value and the registered fingerprint image input at the Nth time and the registered fingerprint images input at the N−1 times belong to the same finger.

2. The fingerprint registration method as claimed in claim 1, further comprising:
discarding the registered fingerprint image input at the Nth time to continue receiving a registered fingerprint image input by the user if the registered fingerprint image input at the Nth time and the registered fingerprint images input at the N−1 times do not belong to the same finger.

3. The fingerprint registration method as claimed in claim 2, further comprising:
recording a number of times that the registered fingerprint image input at the Nth time and the registered fingerprint images input at the N−1 times do not belong to the same finger; and
sending a prompt message to the user to ask the user to input a fingerprint image of the same finger when the number of times exceeds a first preset threshold value.

4. The fingerprint registration method as claimed in claim 3, further comprising:
sending a prompt of whether to delete the registered fingerprint images that have been stored or not to the user when the number of times exceeds a second preset threshold value; and
deleting the registered fingerprint images input at the N−1 times if an instruction to delete from the user is received.

5. The fingerprint registration method as claimed in claim 1, wherein determining whether the registered fingerprint image input at the Nth time and the registered fingerprint images input at N−1 times belong to the same finger based on the feature points of the registered fingerprint image input at the Nth time and the feature points of the registered fingerprint images input at the N−1 times comprises:
matching the feature points of the registered fingerprint image input at the Nth with the feature points of the registered fingerprint images input at the N−1 times to generate N−1 match scores;
determining that the registered fingerprint image input at the Nth time and the registered fingerprint images input at the N−1 times belong to the same finger if all the N−1 match scores are more than a preset threshold value;
determining that the registered fingerprint image input at the Nth time and the registered fingerprint images input at the N−1 times do not belong to the same finger if any of the N−1 match scores is less than the preset threshold value.

6. The fingerprint registration method as claimed in claim 1, wherein the feature points of the registered fingerprint images input at the N−1 times previous to the Nth time are determined by superimposing feature points of the registered fingerprint images input at the previous N−1 times.

7. A fingerprint registration device comprising:
a processor; and
a memory connected with the processor, the memory comprising a plurality of program instructions executable by the processor, the plurality of program instructions comprising:
a receiving module, configured to cause the processor to receive a registered fingerprint image input at an Nth time by a user and retrieving feature points of the registered fingerprint image input at the Nth time, where N is a positive integer;
a judge module, configured to cause the processor to determine whether the registered fingerprint image input at the Nth time and registered fingerprint images input at N−1 times belong to a same finger based on the feature points of the registered fingerprint image input at the Nth time and feature points of the registered fingerprint images input at the N−1 times previous to the Nth time;
an adding module, configured to cause the processor to add the registered fingerprint image input at the Nth time to a candidate collection of registered fingerprint images if the registered fingerprint image input at the Nth time and the registered fingerprint images input at the N−1 times belong to the same finger, wherein a fingerprint template is generated correspondingly based on registered fingerprint images in the candidate collection of registered fingerprint images; and
the receiving module further configured to cause the processor to receive a next registered fingerprint image input at an (N+1)th time by the user, if N is less than a predetermined threshold value and the registered fingerprint image input at the Nth time and the registered fingerprint images input at the N−1 times belong to the same finger.

8. The fingerprint registration device as claimed in claim 7, further comprising:
a discarding module, configured to cause the processor to discard the registered fingerprint image input at the Nth time to continue receiving a registered fingerprint image input by the user if the registered fingerprint image input at the Nth time and the registered fingerprint images input at the N−1 times do not belong to the same finger.

9. The fingerprint registration device as claimed in claim 8, further comprising:
a prompt module, configured to cause the processor to record a number of times that the registered fingerprint image input at the Nth time and the registered fingerprint images input at the N−1 times do not belong to the same finger, and configured to cause the processor to send a prompt message to the user to ask the user to input a fingerprint image of the same finger when the number of times exceeds a first preset threshold value.

10. The fingerprint registration device as claimed in claim 9, wherein the prompt module is configured to cause the processor to send a prompt of whether to delete the registered fingerprint images that have been stored or not to the user when the number of times exceeds a second preset threshold value, and configured to cause the processor to delete the registered fingerprint images input at the N−1 times if an instruction to delete from the user is received.

11. The fingerprint registration device as claimed in claim 7, wherein the judge module is configured to cause the processor to match the feature points of the registered fingerprint image input at the Nth with the feature points of the registered fingerprint images input at the N−1 times to generate N−1 match scores, configured to cause the processor to determine that the registered fingerprint image input at the Nth time and the registered fingerprint images input at the N−1 times belong to the same finger if all the N−1 match scores are more than a preset threshold value, and configured to cause the processor to determine that the registered fingerprint image input at the Nth time and the registered fingerprint images input at the N−1 times do not belong to the same finger if any of the N−1 match scores is less than the preset threshold value.

12. The fingerprint registration device as claimed in claim 7, wherein the feature points comprise at least one of an end point, a bifurcation point, a divergence point, an island, an enclosure, and a short ridge.

13. The fingerprint registration device as claimed in claim 7, wherein the feature points of the registered fingerprint images input at the N−1 times previous to the Nth time are determined by superimposing feature points of the registered fingerprint images input at the previous N−1 times.

14. A mobile terminal comprising a casing, a processor, a memory, a circuit board, and a power circuit, wherein
the circuit board is disposed in a space surrounded by the casing; the processor and the memory are disposed on the circuit board;
the power circuit is configured to supply power to various circuits or components of the terminal device;
the processor runs a program corresponding to executable program instructions through reading the executable program instructions stored in the memory;
the processor executes the executable program instructions to perform following operations:
receiving a registered fingerprint image input at an Nth time by a user and retrieving feature points of the registered fingerprint image input at the Nth time, wherein N is a positive integer;
determining whether the registered fingerprint image input at the Nth time and registered fingerprint images input at N−1 times belong to a same finger based on the feature points of the registered fingerprint image input at the Nth time and feature points of the registered fingerprint images input at the N−1 times previous to the Nth time;
adding the registered fingerprint image input at the Nth time to a candidate collection of registered fingerprint images if the registered fingerprint image input at the Nth time and the registered fingerprint images input at the N−1 times belong to the same finger, wherein a fingerprint template is generated correspondingly based on registered fingerprint images in the candidate collection of registered fingerprint images; and
receiving a next registered fingerprint image input at an (N+1)th time by the user, if N is less than a predetermined threshold value and the registered fingerprint image input at the Nth time and the registered fingerprint images input at the N−1 times belong to the same finger.

15. The mobile terminal as claimed in claim 14, wherein the processor executes the executable program instructions to perform an operation of:
discarding the registered fingerprint image input at the Nth time to continue receiving a registered fingerprint image input by the user if the registered fingerprint image input at the Nth time and the registered fingerprint images input at the N−1 times do not belong to the same finger.

16. The mobile terminal as claimed in claim 15, wherein the processor executes the executable program instructions to perform operations of:
recording a number of times that the registered fingerprint image input at the Nth time and the registered fingerprint images input at the N−1 times do not belong to the same finger; and
sending a prompt message to the user to ask the user to input a fingerprint image of the same finger when the number of times exceeds a first preset threshold value.

17. The mobile terminal as claimed in claim 16, wherein the processor executes the executable program instructions to perform operations of:
sending a prompt of whether to delete the registered fingerprint images that have been stored or not to the user when the number of times exceeds a second preset threshold value; and
deleting the registered fingerprint images input at the N−1 times if an instruction to delete from the user is received.

18. The mobile terminal as claimed in claim 14, wherein the processor executes the executable program instructions to perform operations of:
matching the feature points of the registered fingerprint image input at the Nth with the feature points of the registered fingerprint images input at the N−1 times to generate N−1 match scores;
determining that the registered fingerprint image input at the Nth time and the registered fingerprint images input at the N−1 times belong to the same finger if all the N−1 match scores are more than a preset threshold value; and
determining that the registered fingerprint image input at the Nth time and the registered fingerprint images input at the N−1 times do not belong to the same finger if any of the N−1 match scores is less than the preset threshold value.

19. The mobile terminal as claimed in claim 14, wherein the feature points comprise at least one of an end point, a bifurcation point, a divergence point, an island, an enclosure, and a short ridge.

20. The mobile terminal as claimed in claim 14, wherein the feature points of the registered fingerprint images input at the N−1 times previous to the Nth time are determined by superimposing feature points of the registered fingerprint images input at the previous N−1 times.

* * * * *